United States Patent [19]
Stephan

[11] Patent Number: 6,007,024
[45] Date of Patent: *Dec. 28, 1999

[54] SAFETY DEVICE FOR A CONTAINER DISPOSED IN THE INTERIOR OF AN AIRCRAFT

[75] Inventor: Walter Anton Stephan, St. Martin/Innkreis, Austria

[73] Assignee: Fischer Advanced CompositeComponents Gesellscgaft m.b.H., Ried im Innkreis, Austria

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,785

[22] Filed: Oct. 3, 1996

[30] Foreign Application Priority Data

Oct. 4, 1995 [AT] Austria ................................ 1648/95

[51] Int. Cl.⁶ ...................................................... B64C 1/20
[52] U.S. Cl. .................................. 244/118.1; 244/118.5; 248/503
[58] Field of Search ............................. 244/118.1, 118.5, 244/119; 248/505, 503; 312/245, 242, 351.1

[56] References Cited

U.S. PATENT DOCUMENTS

| | | | |
|---|---|---|---|
| 2,735,377 | 2/1956 | Elsner | 105/369 |
| 3,377,044 | 4/1968 | Jackson et al. | 248/361 |
| 4,125,302 | 11/1978 | Peritz et al. | 312/245 |
| 5,080,453 | 1/1992 | Miller | 312/245 |
| 5,108,048 | 4/1992 | Chang | 244/118.1 |
| 5,131,620 | 7/1992 | Boundy | 248/505 |
| 5,377,856 | 1/1995 | Brierton | 220/1.5 |
| 5,395,074 | 3/1995 | Hart et al. | 244/118.1 |
| 5,549,258 | 8/1996 | Hart et al. | 244/118.1 |

FOREIGN PATENT DOCUMENTS

| | | | |
|---|---|---|---|
| 0 514 957 | 11/1992 | European Pat. Off. | |
| 0 557 267 | 8/1993 | European Pat. Off. | |
| 12 78 850 | 9/1968 | Germany . | |
| 2169256 | 7/1986 | United Kingdom | 244/118.1 |

*Primary Examiner*—Peter M. Poon
*Assistant Examiner*—Tion Dinh
*Attorney, Agent, or Firm*—Jacobson, Price, Holman & Stern, PLLC

[57] ABSTRACT

A safety device for containers, preferably overhead stowage containers, disposed in the interior of aircraft, comprises, in addition to the conventional mountings, at least one connecting member to the container and at least one connecting member to the fuselage, the connecting members being connected to one another via at least one force deflecting element.

6 Claims, 3 Drawing Sheets

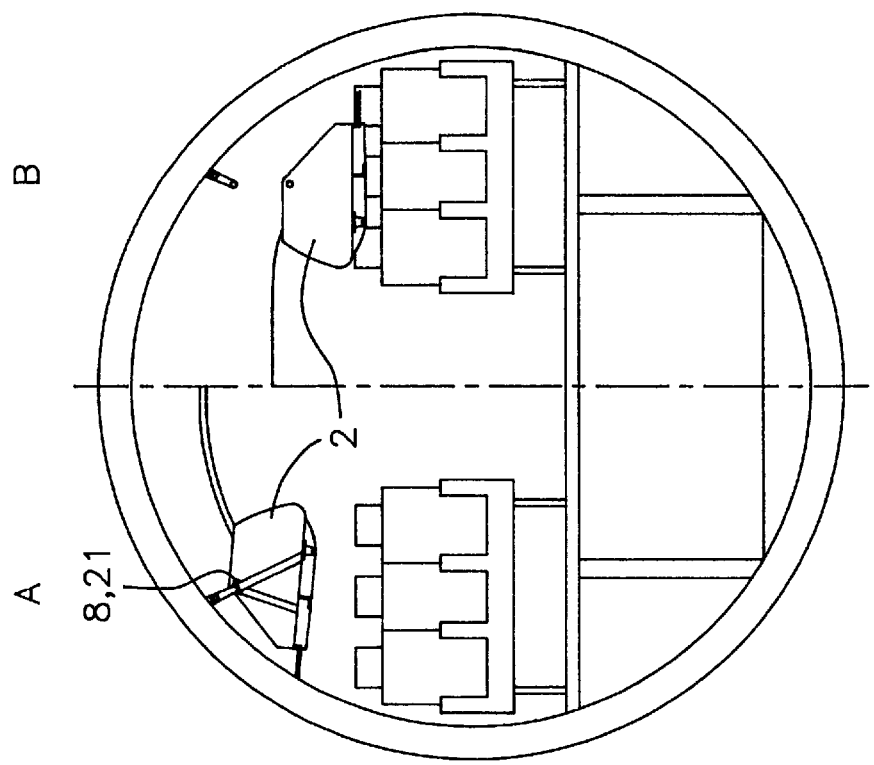
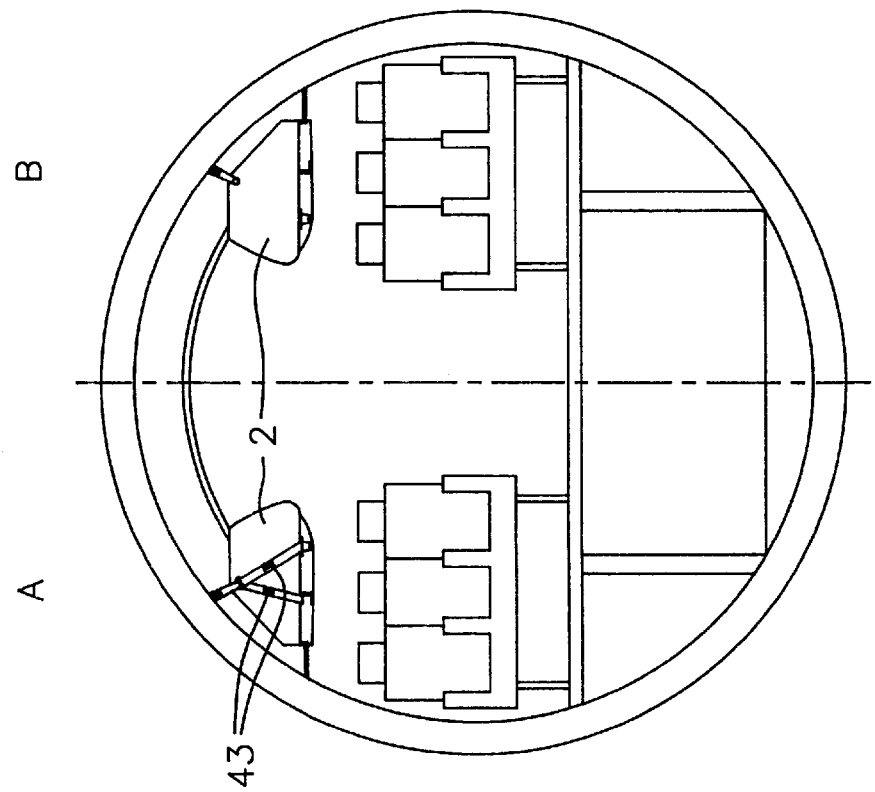

SAFETY DEVICE FOR A CONTAINER DISPOSED IN THE INTERIOR OF AN AIRCRAFT

FIELD OF THE INVENTION

This invention relates to a device for protecting passengers from injury in the case of overstressing of the "overhead stowage containers" disposed in the interior of aircraft, more particularly above the passengers, and to a container for the aircraft industry having a device of the kind specified.

BACKGROUND OF THE INVENTION

In the aircraft industry particular emphasis is placed on the optimum mechanical design of the structural components for safety. This includes the permanent or temporary attachment of structural members or groups thereof in the interior of aircraft, more particularly the attachment of containers, trolleys or the suspension of overhead stowage containers frown the fuselage. The overhead storage containers and the structural members associated therewith are designed for two situations. One situation is routine operations, during which the structural members have to withstand typical stresses, for example, those caused by turbulence without damage; for example for 60,000 flying hours or for 60,000 take-off-and-landing cycles. If the aircraft is subject to turbulence, the inertia of the luggage causes a certain stressing, for example, six times terrestrial acceleration. This is the usual kind of stressing taking place, for example, at the tail or nose of an aircraft. The second kind of stressing takes place in an emergency, for example, a crash. In that case the structural members must withstand approximately 1.5 times the stressing occurring during flying operations. It is permissible for structural members themselves to be destroyed, but the passengers must not suffer injuries as a result. Overhead stowage containers produced to present-day specifications are designed, for example, for static loads of 9 g (9 times terrestrial acceleration) in the forward and 8.5 g in the downward direction. At the present day, suspension systems constructed with a technically justifiable weight are of course designed to withstand such loadings.

Nowadays, aircraft cabins have to accommodate increasingly heavy items of hand baggage, for example, suitcases, laptop computers, photographic and video equipment. The result is high utilisation of baggage stowage containers with relatively heavy baggage, so that the actual weight of baggage in the baggage stowage containers can be quite high. In an emergency, for example, an emergency landing the items of baggage may turn into dangerous projectiles. In that case the baggage stowage containers may remain undamaged, but their supports are damaged and the baggage storage containers and its contents may drop onto the passengers. Other containers used on board aircraft are also being utilised to an ever increasing extent such as, for example, trolleys taking refreshments and beverages to the passengers.

SUMMARY OF THE INVENTION

It is an object of the invention to provide measures to inhibit overhead stowage containers dropping onto the passengers' heads during a crash, emergency landing or other dangerous situation. It is a further object to decelerate the dropping of an overhead stowage container which breaks loose from its conventional mounting and absorb the energy generated thereby. Hitherto such measures have not been customary. It is the aim of the invention to enhance passenger safety by raising the loading limits from the previous 9 times terrestrial acceleration (9 g) to, for example 16 g, without the need to construct significantly heavier aircraft.

Consequently, containers with higher permissible loadings adapted to the present day behaviour of passengers and increased demands call for improved retaining systems, which must be completely newly developed, since the conventional systems are at the limit of their development. This not only leads to higher development costs but also to increased expenditure in production and assembly and also an undesirable increase in the weight of the support systems.

An object of the invention is to provide a device which ensures the maximum possible passenger safety in emergency situations when the containers, mainly overhead stowage containers used inside the aircraft become overloaded or overstressed. Another object is to provide a container which also ensures such safety.

The problems to which the invention relates are addressed by the features of the claims 1, 7 and 8, individually or in any combination. Advantageous embodiments are disclosed in the dependent subclaims.

In an emergency situation, such an emergency landing the construction according to the invention ensures maximum passenger safety by sharing out the task between the conventional container suspension and the safety device.

Any manner of fixing the container, even merely a temporary attachment to any place on the fuselage, is considered to be a suspension. A conventional suspension is free from forces and clearance, while the force deflecting element of the safety device can be attached to existing or newly created points of suspension on the fuselage, a freedom of movement of up to a few millimetres being permitted. The force deflecting element deflects the inertia forces of the base plate, side walls or doors of the container into the supporting construction of the aircraft. The number of force deflecting elements and the points of attachment can be adapted to the maximum acceleration anticipated.

Other features and advantages of the invention will be explained in greater detail in the following description of an embodiment thereof, referring to the accompanying drawings, in which:

BRIEF DESCRIPTION OF THE DRAWINGS

FIG. 1 shows two overhead stowage containers 2, a row of which its provided on both sides of the passenger compartment substantially along its entire length.

As shown in FIG. 1b, it is possible to use only one belt 4.

Figure 1:
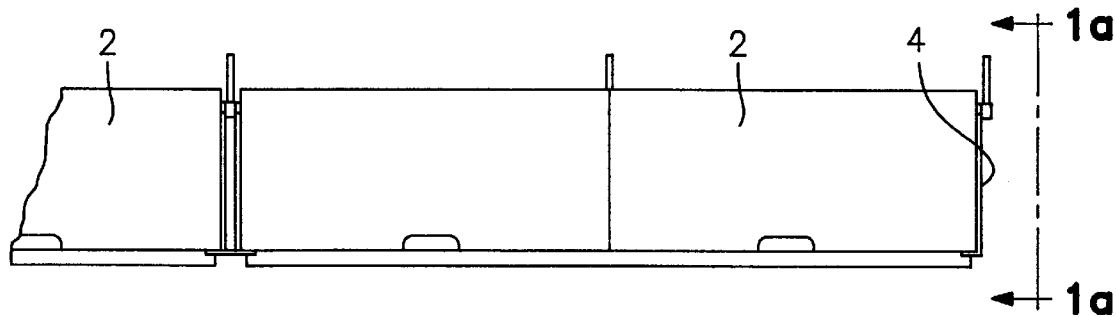
FIG. 1 a diagrammatic side elevation of two containers in a row of overhead stowage containers, FIG. 1a a section, taken along the line 1a—1a in FIG. 1.
Figure 1A:
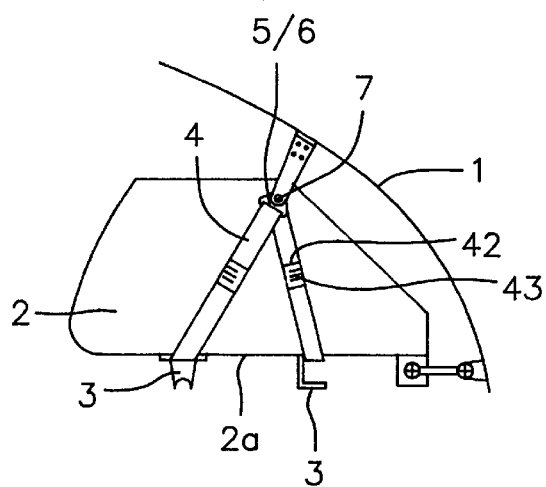
FIG. 1a shows a portion of a fuselage 1 to which the overhead stowage container 2 according to the invention is secured. The inherently strong base plate 2a of the stowage containers 2 is reinforced by longitudinally extending struts 3 which take the form of aluminum sections which can also carry the oxygen supply and further lines or additional units. Secured preferably to the base plate 2a rigidly or, for example, releasably by screwed connection, bayonet-type connections or the like are two belts 4 which inhibit the stowage container 2 dropping onto the passengers in an emergency, after the failure of the conventional suspension systems. The number and construction of the belts can be adapted to the maximum acceleration to be intercepted.
Figure 1B:
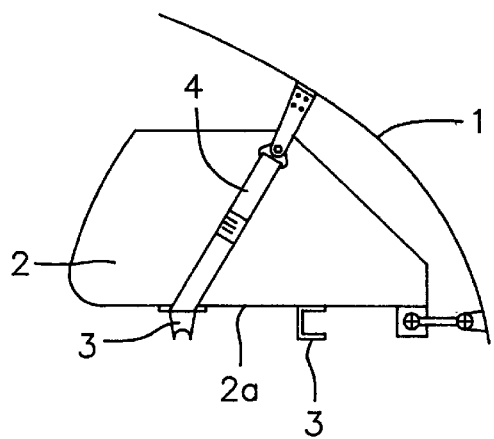
FIG. 1b a variant of the embodiment shown in FIG. 1 having only one belt, FIG. 2 a detail of a belt portion designed to absorb kinetic energy, FIG. 3 a section of a variant attachment of the safety device according to the invention to the fuselage, FIG. 4a an end view of the passenger compartment of an aircraft during normal flying operation, the overhead stowage containers shown in the left-hand part A having the safety device according to the invention, those in the right-hand part D having no such device, and FIG. 4b the view shown in FIG. 4a after loading due to an emergency, for example, a crash.

The belt(s) 4 extend along the stowage container wall, being deflected around corners or rounded portions of the stowage container 2, from the reinforced base plate 2a (advantageously from the mechanically most stable portion of the container) to a place of attachment 5. At the place of attachment 5 the stowage containers 2 are also suspended via the conventional attaching straps or bolts. The flexibility of the force deflecting element is particularly important for deflections around corners or rounded portions of the stowage container 2, to enable the length to be changed in as unimpeded and space saving a manner as possible. The places of attachment 5 are suspended via supporting elements 6 from points of articulation 7 on the fuselage 1.

Figure 2:
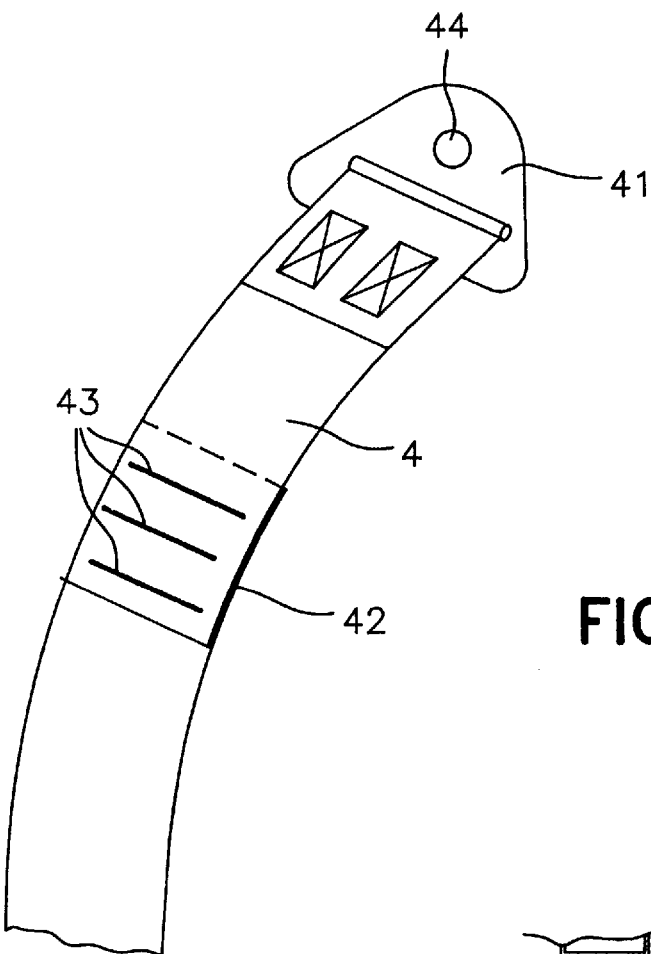

In the embodiment of the belt 4 shown in FIG. 2, a tear-resistant, force-deflecting belt 4 has a suspension plate 41 attached to a sewn strap of the belt. The belt 4 is suspended with only slight freedom of movement from the place of attachment 5 of the storage container 2 or from a separate place of attachment for the safety device according to the invention. If a tensile loading limit determined by the materials and structure of the belt is exceeded, a preferably irreversible change in the length of the belt absorbs kinetic energy and, in a manner similar to a safety belt in a motor vehicle, inhibits the stowage containers 2 from dropping onto the passengers' heads (see FIG. 4b part B). Instead of a belt 4 of changeable length, it is also possible to use at least two component parts of the force deflecting element of constant length which are coupled via a connecting device which will increase in length to absorb energy. As a result, the stowage containers can withstand loadings up to 16 times and 20 times terrestrial acceleration (16 g to 20 g), without the stowage container having to be designed mechanically for such stressing in the zone of its points of suspension, something which would moreover substantially increase its weight. Under such loadings conventional attaching and suspension systems would almost certainly tear away or fail. To distribute the loading of the stowage container 2 over a longer period of time in an emergency, thus also reducing via the associated reduction of acceleration the force acting on the places of attachment 5, the force deflecting element 4 has a device 42 for absorbing kinetic energy. In the embodiment illustrated this device is formed, for example, by a S-shaped or Z-shaped superimposed belt portion which is fixed in this configuration by seams 43. The seams 43 are designed to tear open under a predetermined loading, thereby absorbing energy while the operative portion of the belt 4 increases in length (see FIG. 4b, part A). In an emergency such a lengthening of the belt 4 and the associated lowering of the stowage container 2 by approximately 2 to 3 cm can be tolerated. A hole 44 in the suspension plate 41 is used for suspension from or connection to the points of articulation 7 on the fuselage 1. Instead of the or poach belt 4, the stowage container 2 can also be wrapped in a UD fabric and be provided with suitable straps for suspension from the fuselage. The safety device according to the invention increases the weight of the stowage container by only approximately 3 to 4 while a similar reinforcement of the places of attachment and the suspension devices would cause a weight increase of approximately 20%.

Figure 3:
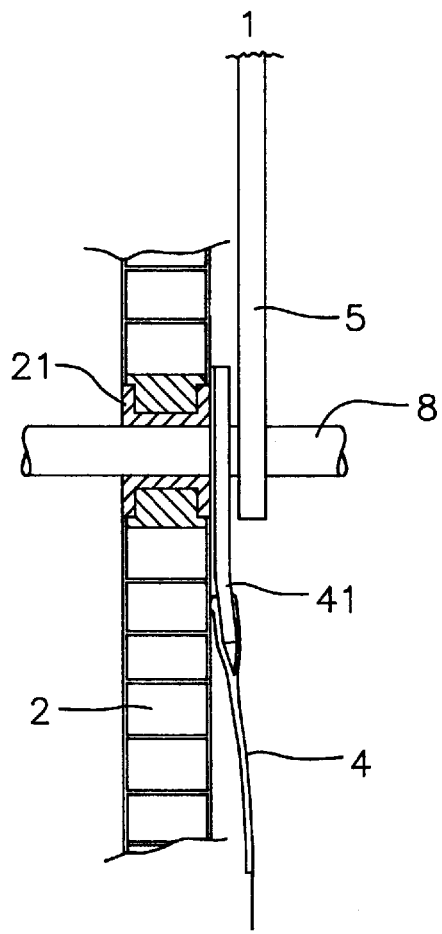

FIG. 3 shows in section a detail of the invention at the place of attachment 5. The place of attachment 5 takes the form of a strap which is disposed on the fuselage 1. A bush 21 is inserted in the side wall of the stowage container 2 in conventional manner and without any specially reinforced construction and is glued or connected in some other manner to said wall. The baggage stowage container 2 is suspended from the fuselage 1 via a pin 8 which extends through an opening in the strap, representing the place of attachment 5 and the bush 21. The belt 4 is also attached to the strap 5, the pin 8 also extending through the opening 44. In an extreme case of stressing the bush 21 will tear open, while the highly stabily constructed and located strap remains intact and therefore the belt 4 also holds. In any case, after the belt 4 has been lengthened by the device for absorbing kinetic energy, it retains the stowage container 2 securely above the passengers' heads (see FIG. 4a, part A). If the strap is not very stably constructed, additional places of attachment can also be provided for the safety device according to the invention and the safety device part of the container 2; there is a relatively considerable freedom as regards the arrangement and number of such places of attachment.

Of course, if required different constructional changes can be made within the scope of the invention. For example, the number of struts 3 and their arrangement can be altered to meet requirements.

What is claimed is:

1. A safety device for an overhead stowage container disposed in the interior of an aircraft, which safety device comprises at least one first connecting member connectable to a base plate of the container and at least one second connecting member connectable to the fuselage and to a top portion of the container, the first and second connecting members being connected to one another via at least one flexible force deflecting element to protect passengers in the aircraft if the container becomes overloaded or overstressed such as during an emergency landing or crash, wherein said flexible force deflecting element is formed by at least one belt and has at least one device to absorb kinetic energy and withstand loadings up to 16 g to 20 g wherein the length of said flexible force deflecting element is changed within given limits irreversibly if a predetermined tensile loading is exceeded.

2. A device according to claim 1, wherein in at least one place on the belt, the belt is formed into loops and fixed in that form with seams intended to burst.

3. A device according to claim 1, wherein said force deflecting element is attached fixed to the container.

4. An overhead stowage container mounted in the interior of an aircraft by a mounting, the container having a safety device to prevent the container from dropping onto a passenger's head during a crash or emergency and to decelerate the dropping of the container if the container breaks loose from the mounting and absorb the energy generated thereby, the safety device comprising at least one first connecting member connected to a base plate of the container and at least one second connecting member connected to the fuselage and to a top portion of the container, the first and second connecting members being connected to one another via at least one flexible force deflecting element to protect passengers in the aircraft if the container becomes overloaded or overstressed such as during an emergency landing or crash, wherein the flexible force deflecting element is formed by at least one belt and has at least one device to absorb kinetic energy wherein the length of said flexible force deflecting element is changed within given limits irreversibly if a predetermined tensile loading is exceeded, the stowage container being capable of withstanding loadings up to 16 g to 20 g without the mounting of the container having to withstand the loadings.

5. A device according to claim 4, wherein in at least on place on the belt, the belt is formed into loops and fixed in that form with seams intended to burst.

6. A device according to claim 4, wherein said force deflecting element is attached fixed to the container.

* * * * *